Jan. 2, 1968     P. F. JACOBSON     3,361,576
FOOD PACKAGE FOR USE IN ELECTRIC TOASTERS
Filed May 24, 1965     3 Sheets-Sheet 1
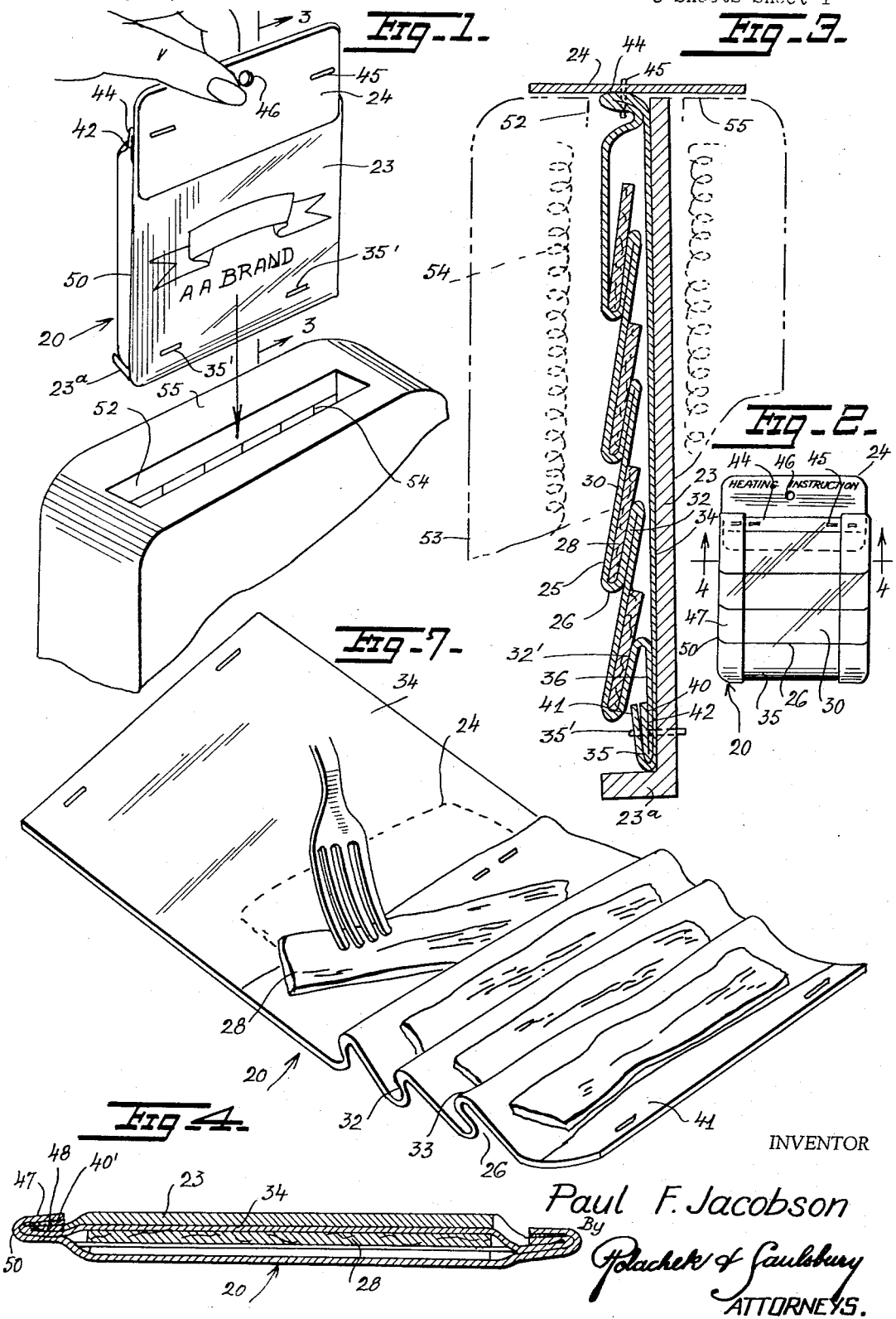
INVENTOR
Paul F. Jacobson
By
Polachek & Saulsbury
ATTORNEYS.

Jan. 2, 1968  P. F. JACOBSON  3,361,576
FOOD PACKAGE FOR USE IN ELECTRIC TOASTERS
Filed May 24, 1965  3 Sheets-Sheet 2
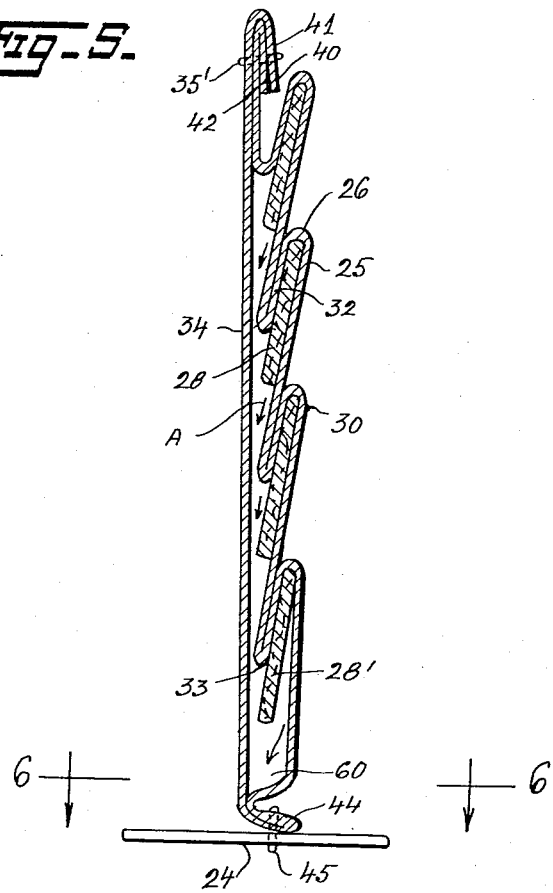
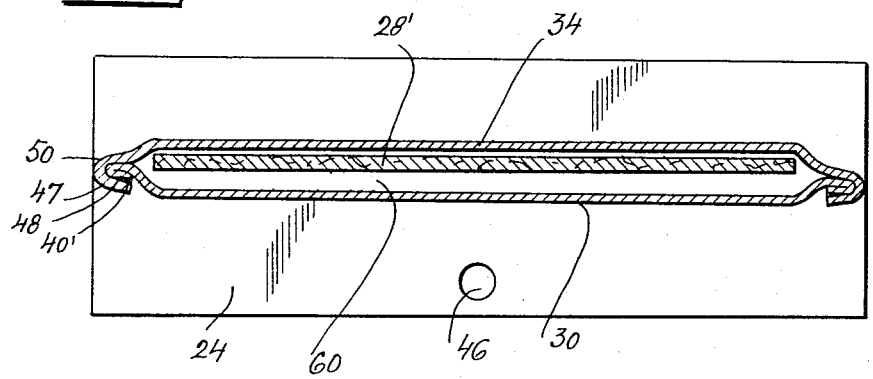
INVENTOR
Paul F. Jacobson
BY Polachek & Saulsbury
ATTORNEYS.

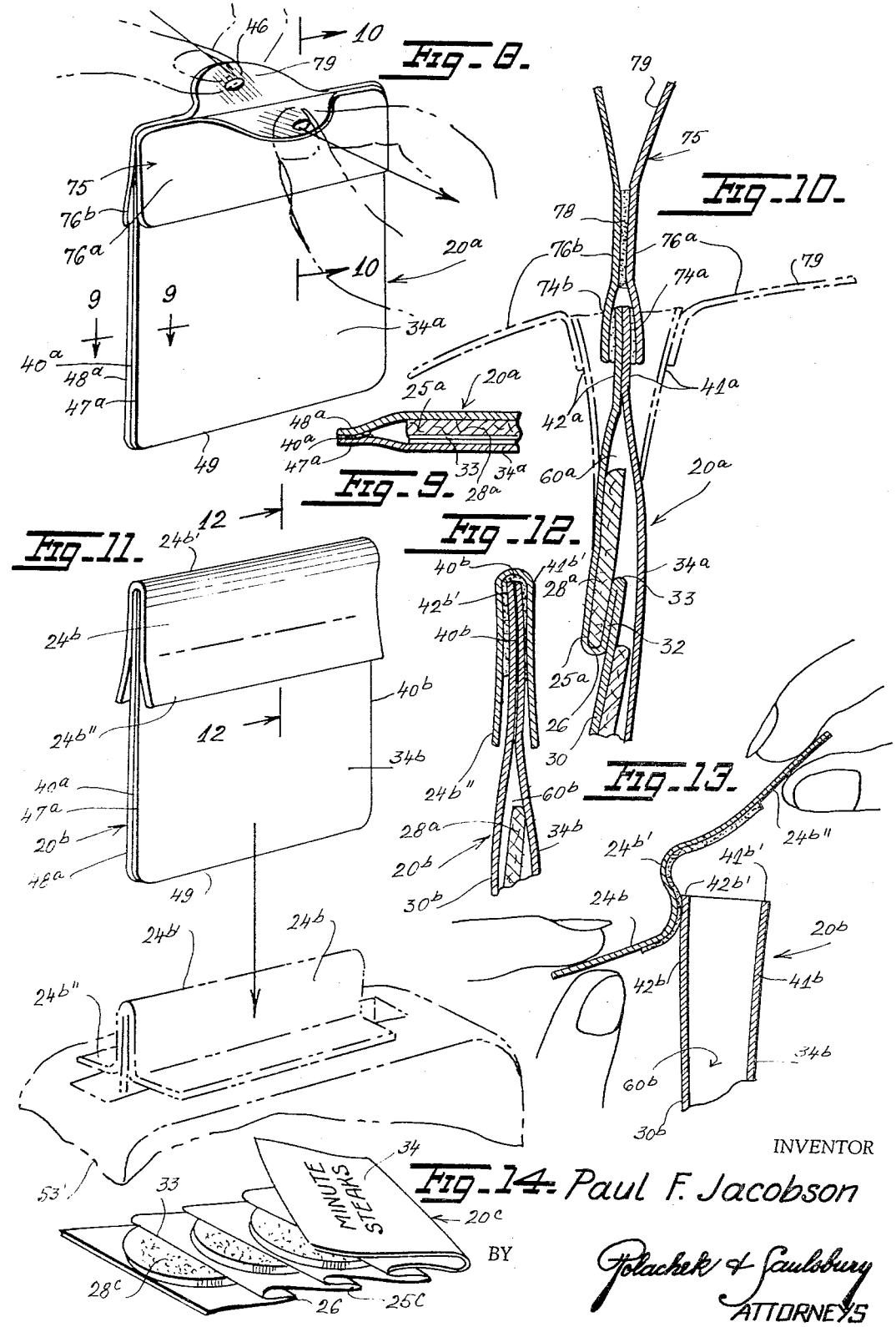

United States Patent Office
3,361,576
Patented Jan. 2, 1968

3,361,576
FOOD PACKAGE FOR USE IN
ELECTRIC TOASTERS
Paul F. Jacobson, 9 Pleasant Valley Lane,
Westport, Conn. 06880
Filed May 24, 1965, Ser. No. 458,051
2 Claims. (Cl. 99—171)

This invention concerns a novel metal foil food package adapted for insertion in an electric toaster to heat the contents of the package and further concerns a transparent plastic or waxpaper or foil package for packaging items of foods or other substances in such a manner that the items which might otherwise stick together or mar each other will be preserved and protected and yet will be readily separable.

According to the invention, there is provided a metal foil package in the form of a pliable, hermetically sealed envelope. The envelope has one wall folded to define pockets in which strips of partially or wholly cooked bacon, ham, minute steaks, hamburger patties and other like foods are contained. The strips may be prefrozen or not. The package can be inserted while still sealed into a slot in an electric toaster for heating and/or defrosting the partially or wholly precooked contents of the package and to complete the cooking of the food if necessary. The package has a novel handle which may serve to support the package while in the toaster as well as providing a means for handling the package. The package is arranged so that after it is heated it can be inverted and excess fat if any will drain off the food into a well in the package. Another feature of this invention is that precooking and freezing of many food products will eliminate excess fat almost completely.

It is therefore a principal object of the invention to provide a metal foil package or envelope having integral pockets for supporting strips of cooked or partially precooked food.

A further object is to provide a package or envelope as described, wherein the package has a handle which serves to hold the package in an upright position when it is inserted in an electric toaster for heating.

Another object is to provide an inexpensive, easily opened, hermetically sealed, simplified foil package containing food which can be heated, defrosted or cooked in an electric toaster while still wrapped in the package.

Still another object is to provide a transparent or otherwise flexible hermetically sealed package for food and other products which would protect and preserve the contents thereof, and permit easy separation of the contents into single units.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective front view of a food package embodying the invention, shown in association with an electric toaster, part of which is broken away.

FIG. 2 is a reduced rear elevational view of the package.

FIG. 3 is an enlarged sectional view taken on line 3—3 of FIG. 1, with parts of the toaster shown in dotted lines.

FIG. 4 is a cross sectional view taken on line 4—4 of FIG. 2.

FIG. 5 is a sectional view similar to FIG. 3 showing the package in an inverted position.

FIG. 6 is a sectional view taken on line 6—6 of FIG. 5.

FIG. 7 is an enlarged perspective view of the package of FIG. 1 in an open condition.

FIG. 8 is a perspective view of another food package according to the invention.

FIG. 9 and FIG. 10 are enlarged fragmentary sectional views taken on lines 9—9 and 10—10 respectively of FIG. 8.

FIG. 11 is a perspective view of a further food package embodying the invention, the package also being partially shown in dotted lines suspended in an electric toaster.

FIG. 12 is an enlarged fragmentary sectional view taken on line 12—12 of FIG. 11.

FIG. 13 is a fragmentary sectional view of the package of FIG. 11 shown being opened after heating.

FIG. 14 is a perspective view of a foil food package embodying the invention, shown in open condition.

Referring first to FIGS. 1–7, there is shown a rather flat, rectangular food package 20 in the form of an envelope made of a single sheet of metal foil to which is attached a rectangular tab 24 and a stiffener 23 if required. The package is made by folding a portion thereof transversely to form a plurality of pockets 25 open at upper ends thereof. The pockets are defined by a plurality of outer transverse folds 26 which are opened upwardly. In each pocket is inserted a strip 28 of food such as bacon. Rear rectangular wall portions 30 of the package define outer rear walls of the pockets. Inner walls of the pockets are defined by norrower wall portions 32 abutting the strips 28 and folded over at upper folds 33 where the wall portions 32 join upper edges of wall portions 30. The entire front of the package is defined by flat front wall 34. The stiffener card or board 23 may be provided if desired to prevent breaking of fragile food products while being shipped. The stiffener may be left in place while the package is being heated and for this purpose may have a squared or right angled bottom edge or foot 23a to have the package rest on the bottom of a toaster compartment. The stiffener 23 is removed from the package as shown in FIGS. 5, 6, 7. The package has a bottom double panel or extension 35 folded over and closed by staples 35′. Stiffener 23 may be secured by staples 35′ to extension 36. Extension 35 is defined by a downwardly extending intermediate wall portion 36 located between lowermost rear wall portion 32′ and the bottom part of front wall 34.

The package is hermetically sealed at its bottom end by a thermoplastic or adhesive 40 applied between abutted edges 41, 42 of the front and rear walls. However, it could also be sealed in like manner at the top. At the upper end of the package is a fold 44 to which rectangular tab 24 is attached by aligned centrally located staples 45. A hole 46 is provided in the tab for hanging the package on a hook or other support.

Lateral abutted edges 47, 48 of the front and rear walls are hermetically sealed by adhesive 40′ which is a continuation of adhesive 40. The sealed edges 47, 48 may be bent over to form lateral vertical folds 50. The edge 47, 48 may be crimped to form hermetic seals without the use of sealing adhesive.

The package can now be torn open as shown in FIG. 7 by tearing open the heat softened thermoplastic seals 40, 40′. This will expose the fully cooked food strips 28 which can now be removed in a heated condition for immediate serving and consumption.

FIGS. 8–10 show another food package 20a which is generally similar to package 20 with an envelope which has folded pockets 25a containing food strips 28a. Package 20a is formed from two rectangular sheets of metal foil. The front sheet defines a smooth front wall 34a and the rear sheet is folded to define the pockets 25a by folds and wall portions identical to those of package 25 and identically numbered. Lateral edges 47a, 48a and bottom edges 49 are abutted and hermetically sealed by means of thermoplastic.

Secured to abutted upper edges 41a, 42a of the two sheets by thermoset plastic adhesive seals 74a, 74b is a tab 75 formed by two generally rectangular parts 76a, 76b. The parts 76a, 76b are in turn secured to each other by an upper thermoplastic adhesive seal 78. Free portions 79 of the tab parts extend upwardly above the upper straight edges of the tabs.

The free portions 79 of the tab parts support the package in a toaster by being spread out horizontally as shown in FIG. 8, and then being placed on top of the toaster with the package suspended inside in a manner similar to the illustrated in FIG. 3. After the package has been heated, the two tab portions 79 can be grasped and pulled apart to rupture a heat softened seal 78 to separate the two walls of the package as indicated by dotted lines in FIG. 10. This exposes the food strips 28a for easy removal. The thermoset seals 74a, 74b will remain intact to resist separation of the tab parts from the package.

In this package a drainage cavity 60a is provided into which fat can drain when the package is inverted prior to opening in a manner similar to that illustrated in FIG. 5.

In FIGS. 11–13 is shown another food package 20b which is similar to package 20a and corresponding parts are identically numbered. In this package, a single rectangular tab 24b is provided. This tab is secured by thermoplastic adhesive layer 40b which extends over upper outer marginal portions of abutted edges 41b, 42b of the two metal foil sheets 34b, 30b. The adhesive also overlays and adheres to the upper free edges 41b', 42b' of the sheets. The tab 24b assumes an inverted U-shaped configuration in cross section with a top fold 24b'. Free bottom leg portions 24b" of the tab are free so that they can be spread out horizontally as shown by dotted lines in FIG. 11 for supporting this package 20b in a vertical position in toaster 53'. After the package 20b is heated it can be inverted to drain excess fat into cavity 60b. Then the package can be opened by lifting up one or both sides 24b" of the tab thereby breaking the seal provided by adhesive layer 40b as indicated in FIG. 13.

FIG. 14 shows round disk-like slices 28c of meats such as salami, bologna, luncheon meat, ham, etc. disposed in folded pockets 25c of package 20c which is in an open condition. Such round food disks can be provided in any one of packages 20, 20a and 20b instead of straight, flat food strips 28, 28a. In any case heating, draining and opening of the package will be accomplished in the same manner as described above.

It will be apparent that the food packages described solve the problem of providing a hermetically sealed metal food package of more economical, simplified construction than prior known packages of this general type. The food is properly supported out of contact with the heater elements in the toaster. No food juices or volatile, flavorful vapors are lost during heating of the package. The metal foil tends to keep heat in the heated food until the package can be opened and the food consumed. The package is simple and safe to use and can be easily discarded after use.

If a package is desired which is not intended for heating in an electric toaster, the package can be made of transparent plastic material such as cellophane, polyethylene, etc. instead of metal foil. In such a case, the folds could be wider to be about three quarters the width of the material to be wrapped. Furthermore, in such a package, the opening could be accomplished by having each side of the wrapper attached to separate halves of a cardboard tab which is rectangular in form and perforated lengthwise at an equal distance from each side of the tab so that it could be easily opened by ripping the tab along the perforation. The opening could be accomplished from either end of the package merely by having the tab attached at the end desired.

The pockets 25 will be provided, the edges will be crimped and other structure will be the same as for hermetic sealing previously described. The packages will be opened prior to cooking to allow the gases to escape.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A food containing package adapted for insertion and heating in a narrow heating compartment of an electric toaster, comprising an envelope made of pliable, heat resistant, thermally conductive, non-porous sheet material, said envelope having a smooth, flat front wall, a rear wall formed with a plurality of transverse folds defining pockets with open tops, thin food members disposed in the respective pockets, the overall thickness of said envelope being less than that of the heating compartment of the toaster, plastic adhesive hermetically sealing edges of the walls together to retain juices and volatile vapors of the food in the envelope when the same is heated in the toaster, and a rectangular tab secured to one end of the envelope to serve as a handle, said tab having free end portions extensible outwardly perpendicular to the plane of the envelope on both sides thereof, said tab having two individual rectangular parts respectively secured to upper marginal end portions of the front and rear walls by thermoset plastic adhesive, and thermoplastic adhesive joining central portions of the two parts of the tab, said thermoplastic adhesive becoming softened when the envelope is heated to facilitate separating the two parts of the tab while the thermoset adhesive remains set.

2. A food containing package adapted for insertion and heating in a narrow heating compartment of an electric toaster, comprising an envelope made of pliable, heat resistant, thermally conductive, non-porous sheet material, said envelope having a smooth, flat front wall, a rear wall formed with a plurality of transverse folds defining pockets with open tops, thin food members disposed in the respective pockets, the overall thickness of said envelope being less than that of the heating compartment of the toaster, plastic adhesive hermetically sealing edges of the walls together to retain juices and volatile vapors of the food in the envelope when the same is heated in the toaster, and a rectangular tab secured to one end of the envelope to serve as a handle, said tab having free end portions extensible outwardly perpendicular to the plane of the envelope on both sides thereof, said material being metal foil, the front and rear walls being made individual rectangular sheets of said metal foil, said tab having two individual rectangular parts respectively secured to upper marginal end portions of the front and rear walls by thermoset plastic adhesive, and thermoplastic adhesive joining central portions of the two parts of the tab, said thermoplastic adhesive becoming softened when the envelope is heated to facilitate separating the two parts of the tab while the thermoset adhesive remains set.

References Cited

UNITED STATES PATENTS

| | | | |
|---|---|---|---|
| 2,509,450 | 5/1950 | Reed et al. | 99—174 |
| 2,807,550 | 9/1957 | Zarotschenzeff et al. | 99—174 |
| 3,117,875 | 1/1964 | Burns et al. | 99—171 X |
| 3,185,372 | 5/1965 | Ferraro. | |

A. LOUIS MONACELL, *Primary Examiner.*

E. A. MILLER, *Examiner.*